3,228,824
REINFORCED RUBBER PRODUCTS
George Mitchel Doyle, Sutton Coldfield, England, assignor to Dunlop Rubber Company Limited, London County, England, a British company
No Drawing. Filed Oct. 21, 1960, Ser. No. 63,949
Claims priority, application Great Britain, Oct. 29, 1959, 36,725/59
12 Claims. (Cl. 161—241)

This invention relates to adhesive compositions especially compositions suitable for bonding textile materials to rubber and to a method of producing such bonding.

In the production of composite articles of textiles and rubber in which the textile serves to reinforce the rubber it is essential to provide a good bond between the textile component and the rubber component. This is important, for example in the production of articles such as pneumatic tires, mechanical belting and hose in which the textile is generally used in the form of cords.

An adhesive which is particularly useful for this purpose is a terpolymer of butadiene, styrene and vinyl pyridine but even this adhesive suffers from certain disadvantages. For example, it loses its flexibility at very low temperatures.

It is an object of this invention to provide particularly advantageous adhesives for this purpose which we obtained from copolymers of dienes and unsaturated ketones. It has previously been proposed to use as an adhesive in the solid form a mixture of a butadiene-methyl isopropenyl ketone copolymert and an incompletely condensed phenolic resin but the proportion of ketone described in such a proposal ranged from 20 percent to 40 percent of the copolymer.

It has now been found that when an adhesive of this kind is used in the form of an aqueous dispersion, by far the best results are obtained when the proportion of unsaturated ketone lies within the range of 0.2 percent to 10 percent of the copolymer.

According to the present invention, therefore, an adhesive composition comprises an admixture in aqueous dispersion of an incompletely condensed phenolic resin and a copolymer of a conjugated diene and an unsaturated ketone, the said copolymer containing from 0.2 percent to 10 percent by weight of the unsaturated ketone.

The preferred copolymers contain from 0.5 percent to 3 percent by weight of the unsaturated ketone.

The unsaturated ketone of the copolymer is preferably an unsaturated aliphatic ketone. Suitable ketones are any of the straight or branched chain unsaturated alkyl ketones such as methyl vinyl ketone, methyl isopropenyl ketone, ethyl vinyl ketone, ethyl isopropenyl ketone, propyl vinyl ketones and isopropyl isopropenyl ketone. Although higher alkyl ketones may be employed, there should preferably be not more than 4 carbon atoms in the alkyl group.

The conjugated diene can be any of the butadiene-1,3 hydrocarbons such as butadiene-1,3 itself, 2-methyl butadiene-1,3 (isoprene), 2,3-dimethyl butadiene-1,3, piperylene, 1-phenyl butadiene-1,3, 2-phenyl butadiene-1,3, 2-neopentyl butadiene-1,3, or other hydrocarbon homologues of butadiene-1,3. Any of the straight chain conjugated dienes or the straight and branched chain hexadienes would be suitable but the butadiene-1,3 hydrocarbons are preferred.

A preferred incompletely condensed phenolic resin is one which is soluble in water or in dilute alkaline solution. An alkali-soluble resorcinol-formaldehyde resin is especially suitable in the practice of this invention.

Suitable adhesive compositions have phenolic resin to copolymer ratios which can be varied over quite considerable limits, for example from 1:9 to 9:1.

The copolymer of the conjugated diene and the unsaturated ketone is preferably prepared by means of emulsion polymerization in an aqueous medium.

The aqueous dispersion of the copolymer can be prepared at an elevated temperature in the presence of a suitable catalyst such as a soluble persulphate, or preparation can take place at a reduced temperature for which a Redox catalyst system is preferred.

The adhesive composition is preferably prepared by mixing together an aqueous dispersion of the copolymer with an aqueous dispersion or solution of the phenolic resin.

An aqueous dispersion of resorcinol-formaldehyde resin, suitable for use in the preparation of the adhesive can be prepared by dissolving resorcinol in water and adding to the resulting solution suitable quantities of a water-soluble alkali such as sodium hydroxide and then adding formaldehyde. The resin is then suitably stored for a few hours at about 25° C., for instance 6 hours at 25° C. or a longer period at a lower temperature. At the end of this period the aqueous dispersion is ready for use.

The copolymer dispersion and the resorcinol-formaldehyde dispersion are then admixed in the proportions desired. Preferably, the mixture is then matured for a period from 12 to 24 hours prior to its use as an adhesive. Mixed dispersions suitable for the practice of this invention usually have a total solids content of from 5 percent to 30 percent but preferably of from 10 percent to 20 percent.

In the preferred method of bonding textile material to rubber the textile is treated with the adhesive composition and allowed to dry, preferably at a temperature between 100° C. and 220° C. The treated textile is then coated with a vulcanizable rubber composition and the rubber vulcanized by heating the resulting assembly at an appropriate temperature and for a suitable time.

Natural and synthetic textile materials can be bonded to natural and synthetic rubbers in accordance with the present invention. The invention is of especial value for bonding fibres of polyamides e.g. nylon, and polyesters, for example, polyethylene glycol terephthalate. Rayon, cotton and other fibres can also be bonded to rubber by the method of this invention and bonds of enhanced strength are obtained as compared with other known rubber/textile adhesives such as natural rubber latices, and butadiene/styrene latices when the latices are admixed with phenol-formaldehyde solutions.

The costs of materials and production of the diene-unsaturated ketone copolymers of the invention, such as butadiene-methyl isopropenyl ketone, are considerably lower than those of other adhesives, such as butadiene-styrene-vinyl pyridine terpolymers, which have previously been proposed.

An additional advantage of the diene-unsaturated ketone copolymers of this invention is that they are flexible at lower temperatures than the butadiene-styrene-vinyl pyridine copolymers. The stiffening temperatures of a number of the copolymers used were determined from their change in rigidity modulus as the temperature was progressively lowered. The rigidity modulus was measured by means of a torsion test and the stiffening temperature was that at which the rigidity modulus commenced to increase rapidly after remaining at a relatively constant low value. Whereas a commercially available butadiene-styrene-vinyl pyridine terpolymer under the low temperature torsion test has a stiffening temperature of −45° C. the corresponding stiffening temperature of 97:3 isoprene-methyl isopropenyl ketone is −55° C. and of 97:3 butadiene-methyl isopropenyl ketone and of 97:3 butadiene-methyl vinyl ketone it is lower than −60° C.

The invention is illustrated by the following examples, all parts being by weight:

EXAMPLE I 100 parts each of seven different mixtures of butadiene and methyl isopropenyl ketone in the proportions 100:0, 99.5:0.5, 97:3, 94:6, 90:10 and 85:15 were each copolymerized in 106 parts of water at 50° C. The reactions were each taken to a 95–100 percent conversion and the concentrations of the latices each adjusted to 40 percent.

11 parts of resorcinol were dissolved in 235.5 parts of water, 16.4 parts of a 36.5 percent solution of formaldehyde were added, followed by 3 parts of a 10 percent solution of sodium hydroxide in water and the mixture was allowed to mature for two hours at 23° C.

To 250 parts of each of the above 40 percent copolymer latices there was added 265.9 parts of a resorcinol-formaldehyde resin solution prepared as described in the immediately preceding paragraph. After maturing the resin copolymer latices at 23° C. for 16 hours, each mixture was applied to 2/4/210 denier nylon by drawing the nylon cord through the latex and then drying. The pick-up of the dried resin copolymer mixtures was about 8 percent to 9 percent, by weight of the weight of the cord. Each of the cords was then embedded in an unvulcanized natural rubber composition and the assembly was cured for 30 minutes at 300° F. The strength of the bond between the treated nylon and the rubber was measured by the pull-through test described by J. O. Wood, Trans. I.R.I., vol. 32, 1, 1–18 (1956). By way of comparison the bond strength between the nylon cord and the rubber was also obtained with a similar adhesive in which the butadiene-methyl isopropenyl ketone copolymer latex was replaced by a copolymer latex containing 70 parts of butadiene and 30 parts of styrene, prepared at low temperature. The bond obtainable with a 70:30 butadiene-styrene copolymer is about the maximum obtainable from a butadiene-styrene copolymer of any styrene content. Comparative bond strength figures of the cured assemblies are given in Table I which also includes a comparable adhesion figure obtained with a natural rubber latex resorcinol-formaldehyde adhesive.

*Table I*

| M.I-K., percent | Styrene, percent | Pull-through (lb.) nylon |
|---|---|---|
| 0 | -------- | 11.3 |
| 0.2 | -------- | 21.5 |
| 0.5 | -------- | [1] 24 |
| 3 | -------- | 25 |
| 6 | -------- | 23.2 |
| 10 | -------- | 22.2 |
| 15 | -------- | 14.1 |
| -------- | 30 | 12.5 |
| -------- | -------- | [2] 10.8 |

[1] Break.
[2] Natural latex/resorcinol-formaldehyde.

The pull-through tests in Table I show that the adhesion between nylon cord and a vulcanizable natural rubber composition obtained by the treatment of the nylon with an admixture, in aqueous dispersion, of resorcinol-formaldehyde resin and a copolymer of butadiene and methyl isopropenyl ketone is markedly influenced by the proportion of the methyl isopropenyl ketone in the copolymer. The presence in the copolymer of from 0.2 percent to 10 percent of methyl isopropenyl ketone, by weight of the copolymer, gives outstanding adhesion figures and the optimum values are found when the proportion of the methyl isopropenyl ketone in the copolymer is from 0.5 percent to 3 percent. The bond is also much greater than that produced by a butadiene-styrene resorcinol-formaldehyde dispersion mixture when the optimum proportion of styrene to butadiene is used. All these adhesives give greater bond strength than is obtained with a natural latex—resorcinol-formaldehyde adhesive.

EXAMPLE II

An adhesive composition similar to those of Example I was prepared using a copolymer latex of butadiene and methyl vinyl ketone in the proportion 97:3. After maturing the mixture of the dispersions of resin and copolymer for 17 hours at 23° C. the adhesive was applied to 2/4/210 denier nylon cord which was then caused to adhere to a natural rubber composition as in Example I. The static adhesion figure obtained was 17.6 lb. which is greater than is obtained with higher proportions of methyl vinyl ketone in the copolymer.

EXAMPLE III

An adhesive composition similar to that of Example II was prepared using a copolymer latex of isoprene and methyl isopropenyl ketone in the proportion 97:3. After maturing for 24 hours at 23° C. the adhesive was applied to nylon cord and the adhesion to rubber tested as for Example II. The adhesion figure was 19.9 lb. which is greater than that which is obtained with higher proportions of isoprene-methyl isopropenyl ketone in the copolymer.

Having now described my invention, what I claim is:

1. A method of bonding a textile material to rubber which comprises applying to the textile material an adhesive composition comprising an admixture, in aqueous dispersion, whose only adhesive ingredients are soluble, incompletely condensed phenolic resin and a copolymer consisting of a conjugated diene and an unsaturated aliphatic ketone, the ratio of phenolic resin to copolymer being from 1:9 to 9:1, and said copolymer containing from 0.2 percent to 10 percent by weight of the unsaturated aliphatic ketone, coating the treated textile material with a vulcanizable rubber composition and vulcanizing the assembly.

2. A method of bonding nylon fibre to rubber which comprises applying to the nylon fibre an adhesive composition comprising an admixture, in aqueous dispersion, whose only adhesive ingredients are soluble, incompletely condensed phenolic resin and a copolymer consisting of a conjugated diene and an unsaturated aliphatic ketone, the ratio of the phenolic resin to copolymer being from 1:9 to 9:1, and said copolymer containing from 0.2 percent to 10 percent by weight of the unsaturated aliphatic ketone, coating the treated nylon fibre with a vulcanizable rubber composition, and vulcanizing the assembly.

3. A reinforced rubber product comprising a base formed from vulcanized rubber having embedded therein textile reinforcing means, said means being coated with an admixture whose only adhesive ingredients are soluble incompletely condensed phenolic resin and a copolymer consisting of a conjugated diene and an unsaturated aliphatic ketone, the ratio of the phenolic resin to copolymer being from 1:9 to 9:1 and said copolymer containing from 0.2 percent to 10 percent by weight of the unsaturated aliphatic ketone which is cured during vulcanization of said base to produce an adhesive bond of increased strength between said reinforcing means and the rubber in the base.

4. A reinforced rubber product according to claim 3 wherein the said copolymer contains from 0.5 percent to 3 percent by weight of the unsaturated aliphatic ketone.

5. A reinforced rubber product according to claim 3 wherein the said conjugated diene is butadiene-1,3.

6. A reinforced rubber product according to claim 3 wherein the said conjugated diene is isoprene.

7. A reinforced rubber product according to claim 3 wherein the said unsaturated aliphatic ketone is an unsaturated alkyl ketone containing not more than four carbon atoms in the alkyl group.

8. A reinforced rubber product according to claim 7 wherein the unsaturated alkyl ketone is methyl isopropenyl ketone.

9. A reinforced rubber product according to claim 7 wherein the unsaturated alkyl ketone is methyl vinyl ketone.

10. A reinforced rubber product according to claim 3 wherein the phenolic resin is a resorcinol-formaldehyde resin.

11. A method of bonding a textile material to rubber according to claim 1 wherein the said admixture in aqueous dispersion has a total solids content of from 5 percent to 30 percent.

12. A method of bonding a textile material to rubber according to claim 11 wherein the total solids content is from 10 percent to 20 percent.

References Cited by the Examiner

UNITED STATES PATENTS

| 2,394,375 | 2/1946 | Gross | 260—43 X |
| 2,561,215 | 7/1951 | Mighton | 154—52 X |
| 2,652,353 | 9/1953 | Wilson | 117—80 |
| 2,669,553 | 2/1954 | Shaffel et al. | |
| 2,902,398 | 9/1959 | Schroeder | 117—80 X |
| 2,955,958 | 10/1960 | Brown | 117—113 |

OTHER REFERENCES

Whitby, G. S.: Synthetic Rubber; John Wiley and Sons, 1954, New York, pages 690–695.

EARL M. BERGERT, *Primary Examiner.*

RICHARD D. NEVIUS, *Examiner.*

D. E. TOWNSEND, C. B. COSBY, *Assistant Examiners.*